United States Patent [19]

Pokhodnya et al.

[11] 4,306,920
[45] Dec. 22, 1981

[54] FLUX COMPOSITION FOR FLUX-CORED WIRE

[76] Inventors: Igor K. Pokhodnya, ulitsa Chkalova, 41-a, kv. 25; Vladimir N. Golovko, ulitsa Vladimirskaya, 9, kv. 29, both of Kiev, U.S.S.R.

[21] Appl. No.: 175,684

[22] Filed: Aug. 5, 1980

[51] Int. Cl.³ .............................................. B23K 35/34
[52] U.S. Cl. ......................................... 148/24; 148/26
[58] Field of Search ...................................... 148/26, 24

[56] References Cited

U.S. PATENT DOCUMENTS

| | | | |
|---|---|---|---|
| 2,805,971 | 9/1957 | Bryan | 148/26 |
| 3,303,323 | 2/1967 | Claussen | 148/26 |
| 3,694,259 | 9/1972 | Chapman | 148/26 |
| 3,800,120 | 3/1974 | Helton | 148/26 |
| 3,818,178 | 6/1974 | Nakabayashi | 148/26 |

*Primary Examiner*—Peter D. Rosenberg
*Attorney, Agent, or Firm*—Fleit & Jacobson

[57] ABSTRACT

Flux composition for a flux-cored wire to be used for welding and surfacing steels with the gas-shielded process comprises flux ingredients in the following amounts, by weight %:

rutile concentrate: 20–53
ferromanganese: 10–22.8
ferrosilicon: 1.3–6
sodium fluosilicate: 1–5
calcined magnesite: 1.3–10
electrocorundum: 1.6–7.5
iron powder: balance.

4 Claims, No Drawings

FLUX COMPOSITION FOR FLUX-CORED WIRE

BACKGROUND OF THE INVENTION

I. Field of the Invention

The present invention relates to welding materials for arc welding and is particularly concerned with a flux composition for flux-cored wires for welding and surfacing steels with a gas-shielded process.

The invention is of particular advantage in the case of flux-cored wires for automatic and semiautomatic welding in all weld positions.

2. Prior Art

There are known flux compositions used to form a core in flux-cored wires for welding steel and surfacing the same with the $CO_2$ process in all weld positions, comprising a steel sheath filled with a powdered welding flux. In particular, the best welding properties are featured by a flux-cored wire having a flux core containing the following ingredients, by weight %:

manganese-silicon: 10-25
ferromanganese: 1-7
iron powder: 2-40
sodium fluoride: 0.5-3
potassium silicate: 0.5-3
titanium dioxide: 30-60
aluminium-magnesium alloy: 1-7
manganese oxide: 3-10
aluminium powder: 0.5-5.0

(cf. U.S. Pat. No. 3,818,178)

The presence in the above flux composition of aluminium and magnesium which form a number of oxides makes it possible to obtain a quality welding slag ensuring a proper formation of the weld. However, the weld thus produced contains a part of aluminium in the form of nitride, which is known to shift a cold shortness threshold to the range of high temperatures. This disadvantage is responsible for the above flux-cored wire having a limited application.

There are also known flux compositions whose cold shortness threshold lies in the range of low temperatures ($-20°$ C.). The best welding properties in this case are manifested by a flux-cored wire having a core composition containing the following ingredients, by weight %:

rutile concentrate: 53.4
manganese dioxide: 4.4
silicon dioxide: 3.0
sodium dioxide: 3.0
magnetite: 6.0
ferromanganese: 13.0
ferrosilicon: 12.0

(cf. U.S. Pat. No. 3,800,120).

It has been established, however, that the weld produced by using a flux-cored wire having a core composed of the above flux ingredients contains a considerable amount of oxygen (0.09 by weight %) and hydrogen (10–12 cm$^3$ per 100 g of the weld metal) which lowers resistance of the weld metal with regard to the formation of hot cracks and the weld notch impact strength at low temperatures. To ensure rapid crystallization of welding slags resulting from melting of the flux-cored wire, and to improve the formation of the weld, a considerable amount of silica is added to the above flux, with the silica content in the weld metal constituting up to 0.8% by weight, which affects plasticity thereof.

The invention resides in the provision of a flux composition for a flux-cored wire for use in surfacing and welding steels with a gas-shielded process, which flux due to a properly selected ingredients improves welding properties of the fluxcored wire and ensures that the hydrogen and oxygen content in the weld metal is as low as possible, thereby imparting thereto improved mechanical properties within a wide range of temperatures.

The principal object of the invention is to provide a flux composition for a flux-cored wire for welding and surfacing steels with a gas-shielded process, which flux composition improves welding properties of the fluxcored wire and ensures that hydrogen and oxygen content be minimized, thereby imparting to the said fluxcored wire improved mechanical properties within a wide range of temperatures.

Another object of the invention is to enhance efficiency of the welding process.

Still another object of the invention is to produce void-free weld metal.

Yet another object of the invention is to obtain weld metal having a minimized amount of non-metallic inclusions.

A further object of the invention is to lower fluidity of the molten slag while welding, and to thereby improve conditions for the formation of the weld metal.

Other objects, advantages and features of the invention will become evident from the following description thereof.

SUMMARY OF THE INVENTION

These and other objects of the invention are accomplished in that a flux composition for a flux-cored wire to be used for welding and surfacing steels with a gas-shielded process, containing rutile concentrate, ferromanganese, ferrosilicon and iron powder, according to the invention further includes sodium fluosilicate, calcined magnesite and a electrocorundum, all the said flux ingredients taken in the following amounts, by weight percent:

rutile concentrate: 20-53
ferromanganese: 10-22.8
ferrosilicon: 1.3-6
sodium fluosilicate: 1-5
calcined magnesite: 1.3-10
electrocorundum: 1.6-7.5
iron powder: balance The presence in the proposed core flux composition of the rutile concentrate in the above amount provides for a stable arcing and a proper formation of the weld.

It has been established that decreasing the content of the rutile concentrate in the proposed core flux composition below the recomended limit impairs stability of arcing and causes spattering of the weld metal i.e. metal formed as a result of a flux-cored wire melting.

When the rutile concentrate content exceeds the upper limit the rate of melting of the flux core is lower than the rate of melting of the steel sheath, which leads to the increase of non-metallic inclusions in the weld metal in the form of unfused particles of the flux of the wire core and, thus, affects the properties of the weld metal.

The amount of ferromanganese and ferrosilicon is determined so as to ensure high mechanical properties of the weld metal. The above content of these ingredients in the proposed flux composition favours the formation of low-melting ferromanganese silicates which readily coagulate and rise to the surface. Non-metallic inclusions which remain in the weld metal are of a spherical shape. All this improves the impact strength of the weld metal.

When the ferromanganese and ferrosilicon content is below the recommended lower limit, there may occur voids in the weld metal, and in the case of their content exceeding the upper limit, hardness of the weld metal increases and notch impact-strength thereof lowers.

During welding, a considerable amount of hydrogen is present in the welding arc zone, which hydrogen dissolves in the metal at high temperatures and then, in the course of crystallization evolves therefrom. Low rate of its evolving from the weld metal is responsible for that in the said weld metal there are formed voids and there remains a considerable amount of hydrogen, thereby lowering mechanical properties of the weld metal. To prevent this the proposed flux composition includes sodium fluosilicate taken in the said amounts. Decreasing the sodium fluosilicate content below the lower limit does not yield any tangible results, whereas its exceeding the upper limit affects the stability of arcing and thereby causes intensive spattering of the electrode metal.

The presence of calcined magnesite in the proposed flux composition in the said amounts rises the flux basicity which favours formation of the weld metal free of non-metallic inclusions, and lowering a total oxygen content.

It has been established that decreasing the calcined magnesite content in the proposed flux below the lower limit yields no results, whereas increasing its content results in intensive spattering of the weld metal, since as a result of decreasing of the oxygen content in drops the surface tension and, hence, the size thereof increase.

Decreasing fluidity of the slag and lowering non-metallic oxides content in the weld metal is attained by introducing into the proposed flux electrocorundum taken in the said amount. Decreasing this amount below the recommended limit results into a greater fluidity of the slag, thus affecting formation of the weld, and in higher content of non-metallic inclusions, which, as a result, sharply brings down efficiency of the welding process.

Its amount being higher than recommended one leads to worsening of welding properties of the slag, with the melting point thereof shifting higher. The rate of melting of the flux was observed to have been lower than that of its steel sheath.

DETAILED DESCRIPTION OF THE INVENTION

The invention will now be explained in greater detail with reference to embodiments thereof.

EXAMPLE 1

Flux-cored wires (A, B and C) 1.6 mm in dia having a core formed from the proposed flux composition were used for welding steel test pieces. Steel sheath of each wire constituted 83% by weight of the flux-cored wire and contained the following ingredients, by weight percent: carbon-0.05; manganese-0.020; silicon-traces; sulphur-0.010; phosphorus-0.010.

Welding steel test pieces was effected in a vertical position with a semiautomatic process using d.c. current of reversed polarity of 200 amp, and welding arc voltage of 23 v.

Carbon dioxide ($CO_2$) was used as a shielding gas.

The steel in the test pieces 20 mm thick contained 0.18% of carbon, 0.45% of manganese, 0.20% of silicon, 0.020% of sulphur, 0.015% of phosphorus, and the balance-iron.

The flux composition used as a core in the flux-cored wire is given in Table 1 below.

TABLE 1

| | Flux-cored wire | | |
|---|---|---|---|
| | A | B | C |
| Core ingredients | weight percentage of the ingredients | | |
| rutile concentrate | 20.0 | 33.2 | 46.5 |
| ferromanganese | 10.0 | 12.5 | 15.0 |
| ferrosilicon | 1.30 | 2.0 | 2.60 |
| sodium fluosilicate | 1.0 | 2.1 | 3.3 |
| calcined magnesite | 1.3 | 5.6 | 10.0 |
| electrocorundum | 1.6 | 4.1 | 6.7 |
| iron powder | 64.0 | 40.5 | 15.9 |

Metal of the weld produced with the use of the flux-cored wires having a core formed from the above flux composition was tested for notch impact strength, specific elongation, and tensile strength, and were subjected to chemical and physical analysis for determining gas content (oxygen, nitrogen and hydrogen in the weld metal.

Mechanical tests were conducted by using conventional methods.

Oxygen, nitrogen and residual hydrogen content in the weld metal was found by using conventional methods of vacuum melting, whereas the content of diffusive hydrogen was determined by the international standard ISO 3690.

The comparative results of mechanical tests and chemical analysis given in Tables 2 and 3 illustrate the advantages of the flux-cored wires having a core formed from the proposed flux over the prior art flux-cored wire (U.S. Pat. No. 3,800,120).

TABLE 2

| Tested flux-cored wire | Tensile strength $kg/mm^2$ | Elongation in % | Notch impact strength (Charpy V-notch test) $kgm/cm^2$ | | |
|---|---|---|---|---|---|
| | | | +20° C. | −20° C. | −40° C. |
| A | 50.5 | 29.5 | 11.5–12.5 | 5.2–5.8 | 3.5–4.2 |
| B | 55.0 | 30.2 | 14.0–17.7 | 6.4–11.7 | 5.7–8.5 |
| C | 60.4 | 22.5 | 10.1–11.3 | 3.8–4.2 | 3.5–3.7 |
| Prior art (U.S. Pat. No. 3,800,120) | 65.0 | 20.5 | 7.5–9.0 | 2.5–3.0 | 0.8–0.8 |

TABLE 3

| Tested flux-cored wire | Gas content, weight % | | Total content of residual and diffusive hydrogen, $cm^3$ per 100 g |
|---|---|---|---|
| | oxygen | nitrogen | hydrogen |
| A | 0.058 | 0.012 | 5.5 |
| B | 0.036 | 0.008 | 3.5 |
| C | 0.044 | 0.007 | 4.0 |
| Prior art (U.S. Pat. No. 3,800,120) | 0.09 | 0.016 | 12.0 |

As can be seen from Table 2 the weld metal resulting from welding with the use of flux-cored wires A, B and C, features better mechanical properties then the weld metal obtained by using a flux-cored wire formed according to U.S. Pat. No. 3,800,120.

In addition, the efficiency of the welding process in the case of the said flux-core wires is about from 2.4 to 3.8 kg per hour, which is 1.5-2 times higher than that obtained by using a flux-cored wire formed according to the above U.S. Patent.

Flux-cored wires having cores formed from the flux of the invention provides for a proper formation of the weld metal and easy removal of the slag coat, as well as high resistance to hot cracks, and a low content of gases.

EXAMPLE 2

Flux-cored wires (A, B and C) of 2.2 mm in dia having a core formed from the proposed flux composition were used for welding steel test pieces. Steel sheath of each wire constituted 80% by weight of the flux-cored wire and contained the following ingredients, by weight percent:

carbon-0.07; manganese-0.25; silicon-0.10; sulphur-0.030; phosphorus-0.030.

Welding steel test pieces was effected in a vertical position (horizontal weld on a vertical surface) with a semiautomatic process using d.c. current of reversed polarity of 350 amp and welding arc voltage of 27 v.

Carbon dioxide ($CO_2$) was used as a shielding gas.

The steel in the test pieces 20 mm thick contained 0.18% of carbon, 0.45% of manganese, 0.20% of silicon, 0.020% of sulphur, 0. 0.015% of phosphorous, and the balance- iron.

The flux composition used as a core in the flux-cored wire is given in Table 1 below.

TABLE 1

| | Flux-cored wire | | |
|---|---|---|---|
| | A | B | C |
| Core ingredients | Weight percentage of the ingredients | | |
| 1 | 2 | 3 | 4 |
| rutile concentrate | 30.0 | 38.5 | 47.0 |
| ferromanganese | 17.5 | 20.0 | 22.5 |
| ferrosilicon | 2.0 | 4.0 | 6.0 |
| sodium fluosilicate | 1.5 | 3.2 | 5.0 |
| calcined magnesite | 2.0 | 6.0 | 10.0 |
| electrocorundum | 2.5 | 5.0 | 7.5 |
| iron powder | 44.5 | 23.3 | 2.0 |

Metal of the weld produced with the use of the flux-cored wire having a core formed from the flux of the invention was tested for notch impact strength, specific elongation, and tensile strength, as well as analized for gas content (oxygen, nitrogen and hydrogen) in the weld metal.

Mechanical tests were carried out by using conventional methods.

Oxygen, nitrogen and residual hydrogen content in the weld metal was found by using conventional methods of vacuum melting, whereas the content of diffusive hydrogen was determined by the international standard ISO 3690.

The test results are given in Table 2.

TABLE 2

| Tested flux-cored wire | Tensile strength, kg/mm$^2$ | Elongation, in % | Notch impact strength (Charpy V-notch test) kgm/cm$^2$ | | |
|---|---|---|---|---|---|
| | | | +20° C. | −20° C. | −40° C. |
| 1 | 2 | 3 | 4 | 5 | 6 |
| A | 53.2 | 28.5 | 10.5–11.2 | 4.5–5.3 | 2.0–3.5 |
| B | 57.0 | 29.2 | 12.5–13.8 | 6.5–7.0 | 3.5–4.0 |
| C | 62.0 | 24.5 | 9.8–10.2 | 4.2–5.0 | 1.8–3.0 |

The comparative results of mechanical tests and chemical analysis given in Table 3 illustrate the advantages of the flux-cored wires having a core formed of the proposed flux over the prior art flux-cored wire (U.S. Pat. No. 3,800,120).

TABLE 3

| Tested flux-cored wire | Gas content, weight % | | Total content of residual and diffusive hydrogen, cm$^3$ per 100 g hydrogen |
|---|---|---|---|
| | oxygen | nitrogen | |
| A | 0.055 | 0.011 | 4.6 |
| B | 0.040 | 0.010 | 3.8 |
| C | 0.044 | 0.011 | 5.2 |
| Prior art (U.S. Pat. No. 3,800,120) | 0.09 | 0.016 | 12 |

As can be seen from Tables 2 and 3 the weld metal resulting from welding with the use of flux-cored wires A, B and C features a high mechanical properties. The flux-cored wires having cores formed from the flux of the invention provides for a proper formation of the weld metal and easy removal of the slag coat, as well as high resistance to hot cracks, and a low content of gases.

In addition, the efficiency of the welding process in the case of the said flux-cored wires is up to 8 kg per hour which is 1.5 times higher than that obtained by using a flux-cored wire manufactured according to U.S. Pat. No. 3,800,120.

EXAMPLE 3

Flux-cored wires (A, B and C) of 2.5 mm in dia having a core formed from the proposed flux composition were used for welding steel test pieces. Steel sheath of each wire constituted 70% by weight thereof and contained the following ingredients, by weight percent: carbon-0.08; manganese-0.30; silicon-0.12; sulphur-0.030; phosphorus-0.030.

Welding steel test pieces was effected in a vertical position with a semiautomatic process using d.c. current of reversed polarity of 450 amp and welding arc voltage of 32 v.

Carbon dioxide ($CO_2$) was used as a shielding gas.

The steel in the test pieces 20 mm thick contained 0.18% of carbon, 0.45% of manganese, 0.20% of silicon, 0.020% of sulphur, 0.015% of phosphorus, and the balance-iron.

The flux composition used as a core in the flux-cored wire is given Table 1 below.

TABLE 1

| | Flux-cored wire | | |
|---|---|---|---|
| | A | B | C |
| Core ingredients | weight percentage of the ingredients | | |
| 1 | 2 | 3 | 4 |
| rutile concentrate | 20.0 | 33.2 | 46.5 |

TABLE 1-continued

| Core ingredients | Flux-cored wire | | |
|---|---|---|---|
| | A | B | C |
| | weight percentage of the ingredients | | |
| 1 | 2 | 3 | 4 |
| ferromanganese | 10.0 | 12.5 | 15.0 |
| ferrosilicon | 1.30 | 2.0 | 2.60 |
| sodium fluosilicate | 1.0 | 2.1 | 3.3 |
| calcined magnesite | 1.3 | 5.6 | 10.0 |
| electro corundum | 1.5 | 4.1 | 6.7 |
| iron powder | 64.8 | 40.5 | 15.9 |

Metal of the welds produced with the use of the flux-cored wires (A, B and C) was tested for notch impact strength, elongation, and tensile strength, as well as analized for gas content (oxygen, hydrogen and nitrogen) in the weld metal.

Mechanical tests were conducted by using conventional methods.

Oxygen, nitrogen and residual content in the weld metal was found by using conventional methods of vacuum melting, whereas the content of diffusive hydrogen was determined by the international standard ISO 3690.

The results of mechanical tests are given in Table 2.

TABLE 2

| Tested flux-cored wire | Tensile strength kg/mm$^2$ | Elonga- tion in % | Notch impact strength (Charpy V-notch test) kgm/cm$^2$ | | |
|---|---|---|---|---|---|
| | | | +20° C. | −20° C. | −40° C. |
| 1 | 2 | 3 | 4 | 5 | 6 |
| A | 50.2 | 29.5 | 12.1–12.4 | 4.5–4.8 | 3.0–4.2 |
| B | 54.3 | 29.8 | 13.5–14.1 | 6.5–7.1 | 3.5–4.5 |
| C | 60.0 | 23.0 | 10.5–11.1 | 4.0–4.3 | 2.8–4.4 |

Gas content in the weld metal is shown in Table 3.

TABLE 3

| Tested flux-cored wire | Gas content weight % | | Total content of residual and diffusive hydrogen, cm$^3$ per 100g hydrogen |
|---|---|---|---|
| | oxygen | nitrogen | |
| A | 0.050 | 0.010 | 5.0 |
| B | 0.034 | 0.008 | 3.6 |
| C | 0.041 | 0.012 | 4.1 |
| Prior art (U.S. Pat. No. 3,800,120) | 0.09 | 0.016 | 12 |

As can be seen from Table 2 the weld metal resulting from welding with the use of flux-cored wires of the invention features a high mechanical properties. These flux-cored wires provide for a proper formation of the weld metal and easy removal of the slag coat, as well as high resistance to hot cracks and low content of gases.

The efficiency of the welding process with the use of the proposed flux-cored wires is up to 15 kg per hour. Rate of formation of angular weld joint, depending on cathetus thereof, constitutes 50–80 m per hour.

EXAMPLE 4 (negative)

Welding test pieces was carried out in the same way, as in Example 1, with the flux-cored wires having a core wherein the ingredients were taken in amounts lower than those indicated in the claimes. The flux-cored wire used was 1.6 mm in diameter, and the steel sheath thereof contained the following ingredients, by weight percent: carbon-0.06; manganese-0.23; silicon-0.09; sulphur-0.020; phosphorus-0.020.

Welding was effected with a welding current of 450 amp, and welding arc voltage of 36 v.

The flux was composed of the following ingredients, by weight percent:

| rutile concentrate | 19.5 |
|---|---|
| ferromanganese | 9.8 |
| ferrosilicon | 1.0 |
| sodium fluosilicate | 0.8 |
| calcined magnesite | 1.2 |
| electrocorundum | 1.4 |
| iron powder | balance |
| Below arc given mechanical test results: | |
| tensile strength, kg/mm$^2$ | 47.0 |
| specific elongation, % | 24.0 |
| impact strength (Charpy V-notch test), kgm/cm$^2$: | |
| +20° C. | 7.2–7.5 |
| −20° C. | 2.0–2.3 |
| −40° C. | 1.2–1.5 |

As can be seen from the above mechanical test results the weld metal features lower mechanical properties: there ware observed more pores and crocks, as well as lower arcing stability and more intensive spattering of the electrode metal.

EXAMPLE 5 (negative)

Welding test pieces was effected, generally, as in Example 3, with the flux-cored wires having a core wherein the ingredients were present in amounts exceeding the upper limits indicated in the attached claims. The flux-cored wire used was 2.5 mm in diameter, and the steel sheath thereof constituted 70% of weight of the wire and contained the following ingredients, by weight percent: carbon-0.08; manganese-0.30; silicon-0.12; sulphur-0.030; phosphorus-0.030.

Welding test pieces was done with welding current of 450 amp and welding arc voltage of 32 v.

The flux was composed of the following ingredients, by weight percent:
rutile concentrate: 47.0
ferromanganese: 23.0
ferrosilicon: 6.2
sodium fluosilicate: 5.2
calcined magnesite: 10.2
electrocorundum: 7.7
iron wire: balance Results of mechanical tests of the weld seam are given below:

| tensile strength, kg/mm$^2$ | 64 |
|---|---|
| specific elongation, % | 19.5 |
| impact strength (Charpy V-notch test), kgm/cm$^2$: | |
| +20° C. | 8.0–9.2 |
| −20° C. | 1.7–2.0 |
| −40° C. | 1.1–1.3 |

As can be inferred from the above test results, the use of the flux having ingredients taken in amounts exceeding the upper limits indicated in the attached claims results in lower welding properties of the said welding wire. In addition, there takes place more intensive spattering of the electrode metal. It also affect the formation process of the weld and lowers the weld metal plasticity.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the ivention as defined in the claims.

We claim:

1. Flux composition for a flux-cored wire for welding and surfacing steels with the gas-shielded process, containing the flux composition ingredients in the following amounts, by weight %:
   - rutile concentrate: 20–53
   - ferromanganese: 10–22.8
   - ferrosilicon: 1.3–6
   - sodium fluosilicate: 1–5
   - calcined magnesite: 1.3–10
   - electrocorundum: 1.6–7.5
   - iron powder: balance.

2. The flux composition of claim 1, wherein the flux composition is located in a steel sheath.

3. In a method of arc welding steel, wherein an electric arc is established between the steel to be welded and a flux-cored electrode wire, and wherein a shielding gas is passed around the arc, the improvement comprising the use of the composition of claim 1 as the core flux composition of the flux-cored electrode wire.

4. A flux-cored wire for welding, wherein the core flux composition of the wire comprises the core flux ingredients in the following amounts, by weight %:
   - rutile concentrate: 20–53
   - ferromanganese: 10–22.8
   - ferrosilicon: 1.3–6
   - sodium fluosilicate: 1–5
   - calcined magnesite: 1.3–10
   - electrocorundum: 1.6–7.5
   - iron powder: balance.

* * * * *